(12) United States Patent
Long (10) Patent No.: US 9,848,056 B2
(45) Date of Patent: Dec. 19, 2017

(54) DATA PROCESSING METHOD, ROUTER, AND NDN SYSTEM

(71) Applicant: Huawei Technologies Co., Ltd., Shenzhen (CN)

(72) Inventor: Youshui Long, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 384 days.

(21) Appl. No.: 14/576,443

(22) Filed: Dec. 19, 2014

(65) Prior Publication Data

US 2015/0106471 A1 Apr. 16, 2015

Related U.S. Application Data

(63) Continuation of application No. PCT/CN2013/070503, filed on Jan. 16, 2013.

(30) Foreign Application Priority Data

Aug. 2, 2012 (CN) .......................... 2012 1 0273202

(51) Int. Cl.
*H04L 29/08* (2006.01)
*G06F 13/26* (2006.01)
*H04L 12/747* (2013.01)

(52) U.S. Cl.
CPC .......... *H04L 67/2842* (2013.01); *G06F 13/26* (2013.01); *H04L 67/2852* (2013.01); *H04L 67/327* (2013.01); *H04L 45/742* (2013.01)

(58) Field of Classification Search
CPC ............................ H04L 67/2842; G06F 13/26
See application file for complete search history.

(56) References Cited

U.S. PATENT DOCUMENTS

| | | | | |
|---|---|---|---|---|
| 5,018,060 | A * | 5/1991 | Gelb | G06F 17/30315 |
| 7,801,973 | B1 * | 9/2010 | Thakur | G06F 3/0605 |
| | | | | 370/229 |
| 2006/0059172 | A1 * | 3/2006 | Devarakonda | G06F 17/30067 |
| 2008/0196033 | A1 * | 8/2008 | Chen | H04L 49/30 |
| | | | | 718/103 |
| 2010/0095082 | A1 * | 4/2010 | Hull | G06F 17/30138 |
| | | | | 711/171 |
| 2011/0137889 | A1 | 6/2011 | Nayberg | |

(Continued)

FOREIGN PATENT DOCUMENTS

| | | |
|---|---|---|
| CN | 1878131 A | 12/2006 |
| CN | 101321090 A | 12/2008 |

(Continued)

OTHER PUBLICATIONS

Zhang, L. et al., "Named Data Networking (NDN) Project," NDN, Technical Report NDN-0001, Oct. 31, 2010, 26 pages.

(Continued)

*Primary Examiner* — Lashonda Jacobs
(74) *Attorney, Agent, or Firm* — Conley Rose, P.C.

(57) ABSTRACT

A data processing method, a router, and an NDN system are disclosed. The method may include obtaining a priority attribute of the data when data is received, setting a life cycle attribute for the data according to a correspondence between the priority attribute and the life cycle attribute, and storing, in a local cache, the data having the life cycle attribute.

16 Claims, 5 Drawing Sheets

(56) References Cited

U.S. PATENT DOCUMENTS

| | | | | |
|---|---|---|---|---|
| 2012/0303850 | A1* | 11/2012 | Sarkar | G06F 13/26 710/265 |
| 2013/0219081 | A1* | 8/2013 | Qian | H04L 67/327 709/241 |
| 2013/0282860 | A1* | 10/2013 | Zhang | H04L 45/306 709/217 |
| 2014/0095778 | A1* | 4/2014 | Chung | G06F 12/0246 711/104 |
| 2014/0358868 | A1* | 12/2014 | Costecalde | G06F 17/30303 707/692 |
| 2016/0139949 | A1* | 5/2016 | Jagannath | G06F 9/5022 718/1 |
| 2016/0360352 | A1* | 12/2016 | Khan | H04L 45/70 |

FOREIGN PATENT DOCUMENTS

| | | |
|---|---|---|
| CN | 101808117 A | 8/2010 |
| CN | 102404133 A | 4/2012 |
| CN | 102571936 A | 7/2012 |
| EP | 2472404 A1 | 7/2012 |
| EP | 2475141 A1 | 7/2012 |

OTHER PUBLICATIONS

Ming, Z., et al., "Age-based Cooperative Caching in Information-Centric Networks," IEEE INFOCOM, Workshop on Emerging Design Choices in Name-Oriented Networking, Mar. 25, 2012, pp. 268-273.

Long, Y., et al., "Off-Path and On-Path Collaborative Caching in Named Data Network," Retrieved from the Internet: URL:http://asiafi.net/meeting/2012/summerschool/submissions/WS/AsiaFI2012-ws-02.pdf, Aug. 20, 2012, 8 pages.

Foreign Communication From a Counterpart Application, European Application No. 13825211.9, Extended European Search Report dated Apr. 29, 2015, 9 pages.

Partial English Translation and Abstract of Chinese Patent Application No. CN102571936, Sep. 23, 2016, 34 pages.

Foreign Communication From a Counterpart Application, Chinese Application No. 2012102732024, Chinese Search Report dated Aug. 9, 2016, 2 pages.

Foreign Communication From a Counterpart Application, Chinese Application No. 2012102732024, Chinese Office Action dated Aug. 18, 2016, 6 pages.

Partial English Translation and Abstract of Chinese Patent Application No. CN1878131, Feb. 18, 2016, 24 pages.

Foreign Communication From a Counterpart Application, Chinese Application No. 201210273202.4, Chinese Search Report dated Dec. 25, 2015, 2 pages.

Foreign Communication From a Counterpart Application, Chinese Application No. 201210273202.4, Chinese Office Action dated Jan. 5, 2016, 5 pages.

Shaowei, Su., et al., "A Bandwidth Adaptive Data Scheduling in P2P VoD System," Microcomputer Applications, vol. 31, No. 9, Sep. 30, 2010, 5 pages.

Foreign Communication From a Counterpart Application, PCT Application No. PCT/CN2013/070503, English Translation of International Search Report dated May 9, 2013, 2 pages.

Foreign Communication From a Counterpart Application, PCT Application No. PCT/CN2013/070503, English Translation of Written Opinion dated May 9, 2013, 6 pages.

* cited by examiner

DATA PROCESSING METHOD, ROUTER, AND NDN SYSTEM

CROSS-REFERENCE TO RELATED APPLICATION

This application is a continuation of International Application No. PCT/CN2013/070503, filed on Jan. 16, 2013, which claims priority to Chinese Patent Application No. 201210273202.4, filed on Aug. 2, 2012, both of which are incorporated herein by reference in their entireties.

TECHNICAL FIELD

The present invention relates to the field of communications technologies, specifically relates to the field of data processing technologies, and in particular, to a data processing method, a router, and a named data networking (NDN) system.

BACKGROUND

NDN provides a data-based architecture, where data is used as an entity on a network, and a "name" is used as a unique identifier of the data. The NDN defines data in two formats: one is data used for sending a request, which may be called an "interest packet"; and the other is data including content, which may be called a "data packet." Data in each format uses a name as a unique identifier, for example, the name of the interest packet is used to uniquely identify a request of the interest packet for obtaining content, and the name of the data packet is used to uniquely identify content loaded in the data packet.

An NDN system includes a data source and at least one router. The data source may be a database or a server that provides original data, and the router may provide a user with a data transmission service and cache data during a data transmission process. In the NDN system, a request message sent by a requester (for example, a user terminal) initiates a data communication process, where the request message carries an identifier of data that is requested to be obtained, that is, a "name" of the data. An operation of the data communication process is performed based on the "name," and is irrelevant to an address (for example, an internet protocol (IP) address or a storage address of the data).

In an existing NDN system, a caching policy of each router is generally determined based on time when the data is requested and/or a frequency at which the data is requested. For example, if a piece of data in a local cache of a router is requested at a relatively high frequency or is just requested to be obtained recently, the local cache of the router considers that the data is hot data and sets a relatively long life cycle for the data, so that the data is stored in the local cache for a relatively long time, so as to ensure a hit ratio of the data. However, because factors affecting the caching policies of routers are the same, that is, the time when the data is requested and/or the frequency at which the data is requested, if same data is requested at a same frequency or at the same time in each router, the data has a same life cycle in the local cache of each router, which may cause that the same data in each router is deleted concurrently, thereby affecting data diversity in the NDN system and affecting a data hit ratio in the NDN system.

SUMMARY

Embodiments of the present invention provide a data processing method, a router, and an NDN system, so that a life cycle attribute of data is set according to a priority attribute of the data, which can implement a differentiated caching policy, increase data diversity in the NDN system, and meanwhile increase a data hit ratio in the NDN system.

A first aspect of the present invention provides a data processing method, which is applied to an NDN system and may include obtaining a priority attribute of the data when data is received, setting a life cycle attribute for the data according to a correspondence between the priority attribute and the life cycle attribute, and storing, in a local cache, the data having the life cycle attribute.

In a first possible implementation manner, after the obtaining a priority attribute of the data, the method further includes re-setting a priority attribute for the data according to a priority setting rule, and returning the data having the re-set priority attribute to a requester of the data.

With reference to the first aspect, or the first possible implementation manner of the first aspect, in a second possible implementation manner, the life cycle attribute includes a first life cycle and a second life cycle, where the second life cycle is longer than the first life cycle.

With reference to the second possible implementation manner of the first aspect, in a third possible implementation manner, the storing, in a local cache, the data having the life cycle attribute includes determining, according to a size of the data, whether the local cache has storage space used for storing the data. If a determining result is no, releasing storage space of the local cache according to a life cycle attribute of existing data in the local cache, and storing, in the local cache, the data having the life cycle attribute.

With reference to the third possible implementation manner of the first aspect, in a fourth possible implementation manner, the releasing storage space of the local cache according to a life cycle attribute of existing data in the local cache includes generating a first replacement queue and a second replacement queue by using a preset replacement algorithm according to the life cycle attribute of the existing data in the local cache, where the first replacement queue includes data of which a life cycle attribute is the first life cycle in the local cache, and the second replacement queue includes data of which a life cycle attribute is the second life cycle in the local cache, and if a size of the data to be cached is less than or equal to a total sum of sizes of all data in the first replacement queue, deleting existing data in the first replacement queue according to the size of the data, or if the size of the data to be cached is greater than the total sum of sizes of all the data in the first replacement queue, deleting all the data in the first replacement queue, and deleting existing data in the second replacement queue according to a difference between the size of the data and the total sum of sizes of all the data in the first replacement queue.

With reference to the second possible implementation manner of the first aspect, in a fifth possible implementation manner, before the data is received, the method further includes receiving a request message sent by the requester, where the request message carries an identifier of data that is requested to be obtained, searching for the data in the local cache according to the identifier, and if the data is not found in the local cache, forwarding the request message to a next node according to routing information, and receiving data which is returned by the next node according to the request message, or if the data is found in the local cache, setting, according to the priority setting rule, a priority attribute for the found data that is requested to be obtained, and returning the data having the priority attribute to the requester.

With reference to the second possible implementation manner of the first aspect, the third possible implementation manner of the first aspect, the fourth possible implementation manner of the first aspect, or the fifth possible implementation manner of the first aspect, in a sixth possible implementation manner, the priority attribute includes a first priority and a second priority, where a level of the second priority is higher than a level of the first priority.

With reference to the sixth possible implementation manner of the first aspect, in a seventh possible implementation manner, the correspondence between the priority attribute and the life cycle attribute includes that if data of which a priority attribute is the first priority is received, a life cycle attribute of the data is set to the first life cycle when the data is stored in the local cache, and if data of which a priority attribute is the second priority is received, a life cycle attribute of the data is set to the second life cycle when the data is stored in the local cache.

With reference to the seventh possible implementation manner of the first aspect, in an eighth possible implementation manner, the priority attribute further includes a third priority, where a level of the third priority is higher than the level of the first priority, and is lower than the level of the second priority, and the correspondence between the priority attribute and the life cycle attribute further includes that if data of which a priority attribute is the third priority is received, a life cycle attribute of the data is set to the first life cycle or the second life cycle according to a random probability when the data is stored in the local cache.

With reference to the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, or the eighth possible implementation manner of the first aspect, in a ninth possible implementation manner, the priority setting rule includes that if the data exists in the local cache, the priority attribute of the data is set to the first priority, if the data exists in a data source, the priority attribute of the data is set to the third priority, if data of which a priority attribute is the first priority is received, the priority attribute of the data is re-set to the third priority when the data is forwarded, if data of which a priority attribute is the third priority is received, the priority attribute of the data is re-set to the first priority or the second priority according to the random probability when the data is forwarded, and if data of which a priority attribute is the second priority is received, the priority attribute of the data is re-set to the first priority when the data is forwarded.

A second aspect of the present invention provides a router, which is applied to an NDN system and may include a priority obtaining module configured to obtain a priority attribute of the data when data is received, a life cycle setting module configured to set a life cycle attribute for the data according to a correspondence between the priority attribute and the life cycle attribute, and a storing module configured to store, in a local cache, the data having the life cycle attribute.

In a first possible implementation manner, the router further includes a priority setting module configured to re-set a priority attribute for the data according to a priority setting rule, and a responding module configured to return the data having the re-set priority attribute to a requester of the data.

With reference to the second aspect, or the first possible implementation manner of the second aspect, in a second possible implementation manner, the life cycle attribute includes a first life cycle and a second life cycle, where the second life cycle is longer than the first life cycle.

With reference to the second possible implementation manner of the second aspect, in a third possible implementation manner, the storing module includes a space determining unit configured to determine, according to a size of the data, whether the local cache has storage space used for storing the data, a releasing unit configured to if a determining result is no, release storage space of the local cache according to a life cycle attribute of existing data in the local cache, and a storing unit configured to store, in the local cache, the data having the life cycle attribute.

With reference to the third possible implementation manner of the second aspect, in a fourth possible implementation manner, the releasing unit includes a queue generating unit configured to if a determining result is no, generate a first replacement queue and a second replacement queue by using a preset replacement algorithm, where the first replacement queue includes data of which a life cycle attribute is the first life cycle in the local cache, and the second replacement queue includes data of which a life cycle attribute is the second life cycle in the local cache, and a releasing subunit configured to if a size of the data to be cached is less than or equal to a total sum of sizes of all data in the first replacement queue, delete existing data in the first replacement queue according to the size of the data, or if the size of the data to be cached is greater than the total sum of sizes of all the data in the first replacement queue, delete all the data in the first replacement queue, and delete existing data in the second replacement queue according to a difference between the size of the data and the total sum of sizes of all the data in the first replacement queue.

With reference to the second possible implementation manner of the second aspect, in a fifth possible implementation manner, the router further includes a request receiving module, configured to receive a request message sent by the requester, where the request message carries an identifier of data that is requested to be obtained, a local searching module configured to search for the data in the local cache according to the identifier, and a processing module configured to if the data is not found in the local cache, forward the request message to a next node according to routing information, and receive data which is returned by the next node according to the request message, or if the data is found in the local cache, instruct the priority setting module to set, according to the priority setting rule, a priority attribute for the found data that is requested to be obtained, and return the data having the priority attribute to the requester.

A third aspect of the present invention provides an NDN system, which includes a data source and at least one router, where the router is the foregoing router, and the data source is connected to the at least one router and is configured to return, to the router according to a request message sent by the router, data that is requested to be obtained.

Implementation of the embodiments of the present invention has the following benefits.

It can be known from the above description that in some feasible implementation manners of the present invention, data includes a priority attribute, a life cycle attribute of the data is set according to the priority attribute of the data, and the data having the life cycle attribute is stored in a local cache, because when routers receive the same data, there may be a difference between the priority attributes of the data received by the routers, there may also be a difference between the life cycle attributes of the data which are obtained according to the priority attributes. In this way, a differentiated caching policy can be formed between the routers, so that the same data has different life cycles in caches of the routers, which can ensure data diversity in an NDN system, and meanwhile increase a data hit ratio in the NDN system.

BRIEF DESCRIPTION OF DRAWINGS

To describe the technical solutions in the embodiments of the present invention more clearly, the following briefly introduces the accompanying drawings required for describing the embodiments or the prior art. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The embodiments to be described are merely a part rather than all of the embodiments of the present invention. Based on the embodiments of the present invention, all other embodiments obtained by a person skilled in the art without creative efforts fall into the scope of the present invention.

In the embodiments of the present invention, a priority attribute of data is used to indicate a priority of the data, and the priority of the data may be used to indicate complexity of a process of obtaining the data. The higher the priority of the data is, the more complex the process of obtaining the data is; and the lower the priority of the data is, the simpler the process of obtaining the data is. For example, if data exists in a cache of a router and a requester initiates a request message for obtaining the data to the router, the router may directly obtain the data from a local cache and return the data to the requester. Therefore, the process of obtaining the data is simple, and when the router returns the data to the requester, the router sets a relatively low priority attribute for the data. For another example, if data exists in a data source and when the requester initiates a request message for obtaining the data to a router, the router needs to forward the request message according to routing information until the data source receives the request message and returns the data. In this case, the process of obtaining the data is relatively complex, and when the data source returns the data, the data source sets a relatively high priority attribute for the data.

A life cycle attribute of data is used to indicate a life cycle of the data in a cache. The longer the life cycle of the data is, the longer the survival time of the data in the cache is; and the shorter the life cycle of the data is, the shorter the survival time of the data in the cache is.

In the embodiments of the present invention, a priority attribute of data may be used to affect a life cycle attribute of the data, so as to implement a differentiated caching policy for each router in an NDN system, ensure data diversity in the NDN system, and meanwhile increase a data hit ratio in the NDN system.

Figure 1:
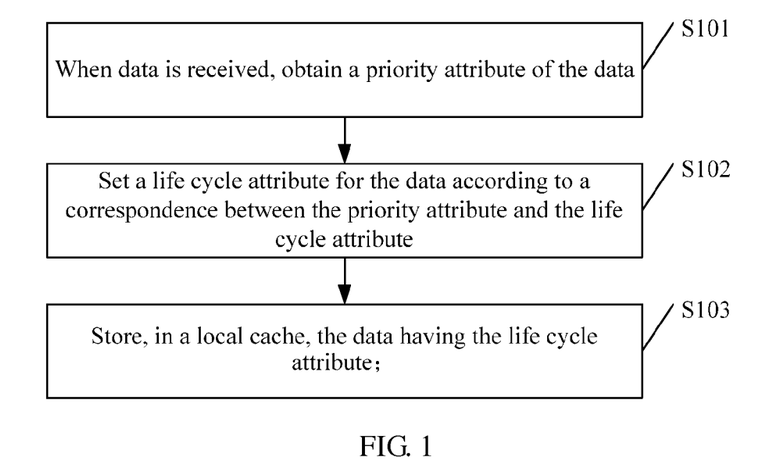
FIG. 1 is a flowchart of a data processing method according to an embodiment of the present invention.
Figure 2:
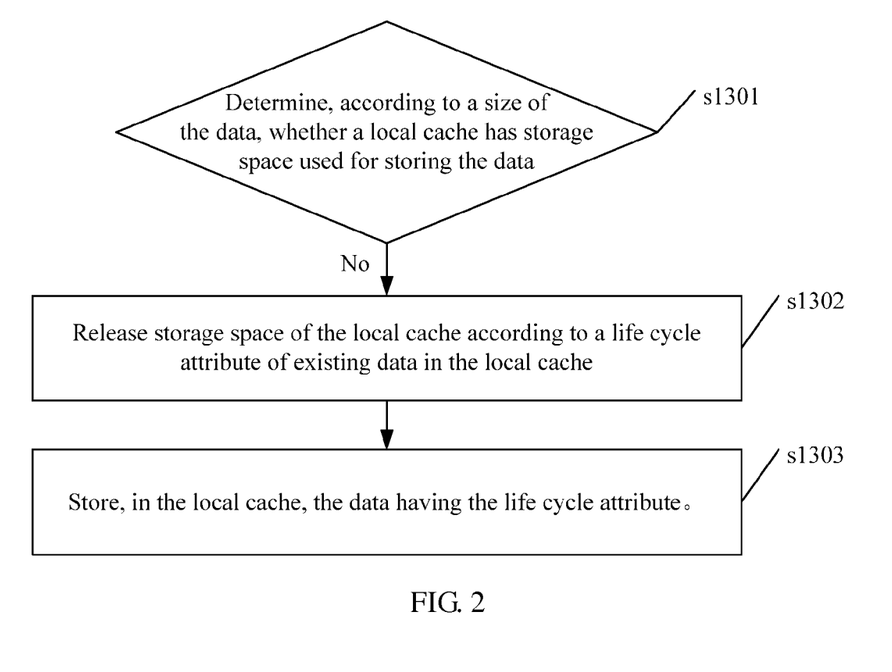
FIG. 2 is a flowchart of an embodiment of step S103 shown in FIG. 1.
Figure 3:
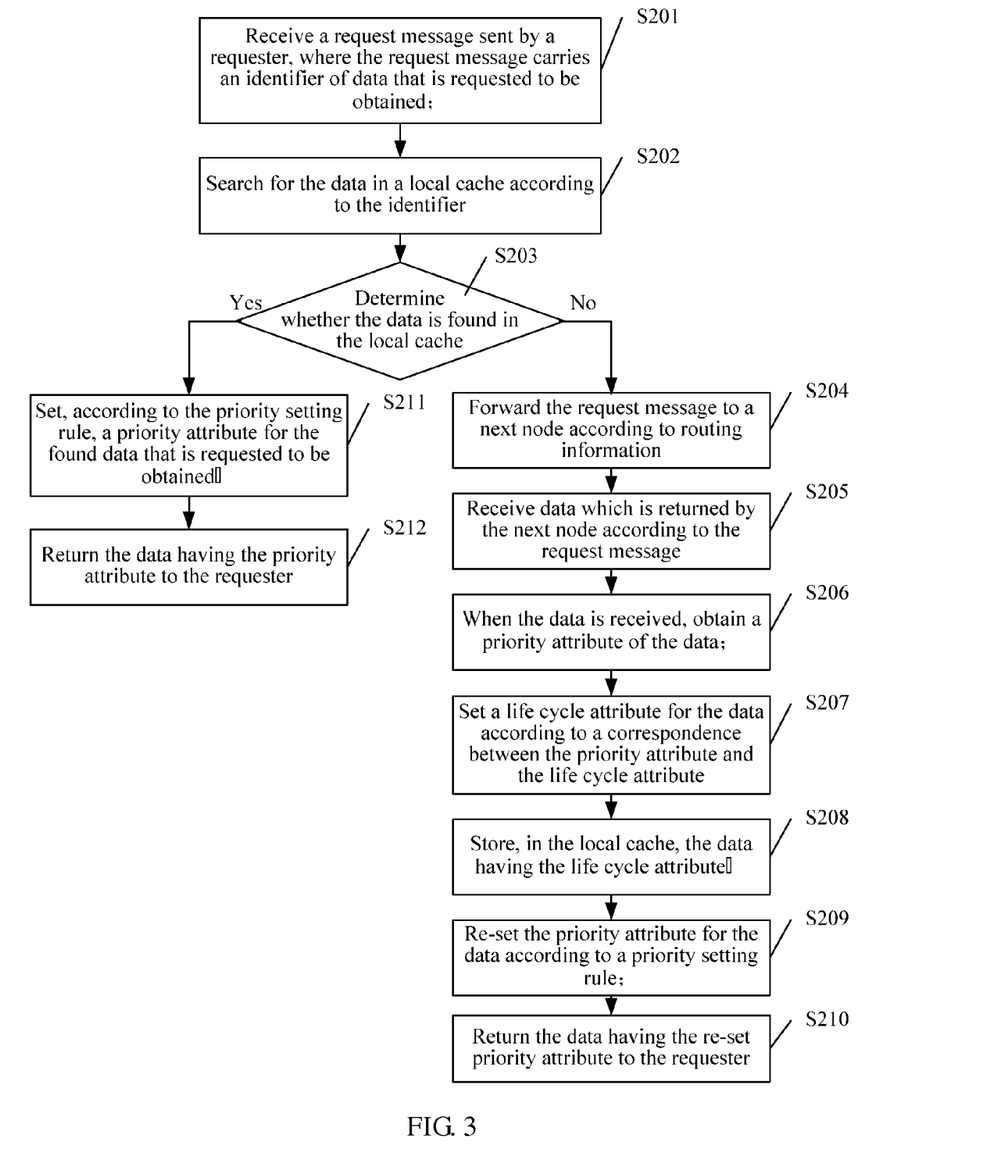
FIG. 3 is a flowchart of another data processing method according to an embodiment of the present invention.

The following describes, in detail with reference to FIG. 1 to FIG. 3, a data processing method provided by an embodiment of the present invention. The following data processing method may be applied to the NDN system.

FIG. 1 is a flowchart of a data processing method according to an embodiment of the present invention. The method may include the following step S101 to step S103.

S101. When data is received, obtain a priority attribute of the data.

In this step, data may be received from another router except a local end router. When the another router sends the data, the another router sets a priority attribute for the data. When the local end router receives the data, the local end router obtains the priority attribute of the data. In this step, data may also be received from a data source. When the data source sends the data, the data source may return the data not having the priority attribute to the local end router. After receiving the data, the local end router sets a priority attribute for the data according to a priority setting rule. When the data source sends the data, the data source may also set a priority attribute for the data. When receiving the data, the local end router obtains the priority attribute of the data.

The priority attribute in this embodiment of the present invention may have the following two feasible implementation manners.

In a first feasible implementation manner, a priority of the data may include two levels, that is, the priority attribute of the data may include a first priority and a second priority, where a level of the second priority is higher than a level of the first priority. That is, in this implementation manner, each piece of data corresponds to one priority attribute, and the priority of the data indicated by the priority attribute may be a low priority (that is, the first priority) or a high priority (that is, the second priority).

In a second feasible implementation manner, a priority of the data may include three levels, that is, the priority attribute of the data may include a first priority, a third priority, and a second priority, where a level of the second priority is higher than a level of the third priority and the level of the third priority is higher than a level of the first priority. That is, in this implementation manner, each piece of data corresponds to one priority attribute, and the priority of the data indicated by the priority attribute may be a low priority (that is, the first priority), an intermediate priority (that is, the third priority), or a high priority (that is, the second priority).

It should be noted that unless otherwise specified, in subsequent descriptions of this embodiment of the present invention, the low priority represents the first priority, the intermediate priority represents the third priority, and the high priority represents the second priority.

In the foregoing two feasible implementation manners, each priority may include at least one level, for example, the low priority may include a level 1-1, a level 1-2, and a level 1-3; the intermediate priority may include a level 2-1 and a level 2-2; and the high priority may include a level 3-1 and a level 3-2. During specific implementation, the quantity of levels included in a priority may be set according to actual needs.

S102. Set a life cycle attribute for the data according to a correspondence between the priority attribute and the life cycle attribute.

The life cycle attribute includes a first life cycle and a second life cycle, where the second life cycle is longer than the first life cycle. That is, in this implementation manner, each piece of data corresponds to one life cycle attribute, and a life cycle of the data indicated by the life cycle attribute may be a short life cycle (that is, the first life cycle) or a long life cycle (that is, the second life cycle).

It should be noted that unless otherwise specified, in subsequent descriptions of the present invention, the short life cycle represents the first life cycle and the long life cycle represents the second life cycle.

In this embodiment of the present invention, the correspondence between the priority attribute and the life cycle attribute may be preset. Corresponding to the two feasible implementation manners of the priority attribute, the correspondence between the priority attribute and the life cycle attribute in the present invention may also have the following two feasible implementation manners.

In a first feasible implementation manner, the priority attribute includes a low priority or a high priority. In this case, the correspondence between the priority attribute and the life cycle attribute may be shown in the following Table 1.

TABLE 1

| Correspondence table (1) between the priority attribute and the life cycle attribute | |
|---|---|
| Priority attribute | Life cycle attribute |
| Low priority | Short life cycle |
| High priority | Long life cycle |

According to the foregoing Table 1, in this implementation manner, the correspondence between the priority attribute and the life cycle attribute may include that if data of which a priority attribute is the low priority is received, a life cycle attribute of the data is set to the short life cycle when the data is stored in a local cache, and if data of which a priority attribute is the high priority is received, a life cycle attribute of the data is set to the long life cycle when the data is stored in a local cache.

In a second feasible implementation manner, the priority attribute includes a low priority, an intermediate priority, or a high priority. In this case, the correspondence between the priority attribute and the life cycle attribute may be shown in the following Table 2.

TABLE 2

| Correspondence table (2) between the priority attribute and the life cycle attribute | |
|---|---|
| Priority attribute | Life cycle attribute |
| Low priority | Short life cycle |
| Intermediate priority | Short life cycle |
| Intermediate priority | Long life cycle |
| High priority | Long life cycle |

According to the foregoing Table 2, in this implementation manner, the correspondence between the priority attribute and the life cycle attribute may include that if data of which a priority attribute is the low priority is received, a life cycle attribute of the data is set to the short life cycle when the data is stored in the local cache, if data of which a priority attribute is the high priority is received, a life cycle attribute of the data is set to the long life cycle when the data is stored in the local cache, and if data of which a priority attribute is the intermediate priority is received, a life cycle attribute of the data is set to the short life cycle or the long life cycle according to a random probability when the data is stored in the local cache.

In this implementation manner, in a manner of setting a life cycle for data having an intermediate priority according to a random probability, the random probability is adjusted dynamically to adjust a ratio of the quantity of data having the short life cycle to the quantity of data having the long life cycle in the local cache. For example, if it needs to be ensured that the ratio of the quantity of the data having the short life cycle to the quantity of the data having the long life cycle in the local cache is 1, that is, it is ensured that the quantity of the data having the short life cycle is equal to the quantity of the data having the long life cycle in the local cache, the random probability may be set according to the current quantity of data having the short life cycle and the current quantity of data having the long life cycle in the local cache, and a life cycle attribute of data having an intermediate priority is set to the short life cycle or the long life cycle. The random probability is adjusted dynamically, so that the quantity of the data having the short life cycle becomes equal to the quantity of the data having the long life cycle in the local cache. The manner of setting, by using the random probability, a life cycle for the data having an intermediate priority can ensure a balance between the quantity of the data having the short life cycle and the quantity of the data having the long life cycle in a cache of each router in the NDN system, and ensure sustainability and validity of an impact that the priority attribute exerts on a caching policy of each router.

S103. Store, in the local cache, the data having the life cycle attribute.

The local cache performs storage updating according to the life cycle attribute of the data stored in the local cache, where the updating operation may include deleting existing data or replacing existing data.

FIG. 2 is a flowchart of an embodiment of step S103 shown in FIG. 1. The step S103 may include the following step s1301 to step s1303.

s1301. Determine, according to a size of the data, whether the local cache has storage space used for storing the data. If a determining result is no, the process proceeds to step s1302.

Before caching the data, the local cache first determines, according to a size of the data, whether the local cache has storage space used for storing the data. If the local cache has insufficient storage space, for example, the storage space of the local cache is full, or the storage space of the local cache is not full but is not enough to store the data, updating of the local cache is triggered to release enough storage space. That is, when the determining result of this step is no, the process proceeds to step s1302.

s1302. Release storage space of the local cache according to a life cycle attribute of the existing data in the local cache.

In a feasible implementation manner of the present invention, this step s1302 may include the following steps.

A. Generate a first replacement queue and a second replacement queue by using a preset replacement algorithm according to the life cycle attribute of the existing data in the local cache, where the first replacement queue includes data of which a life cycle attribute is the first life cycle in the local cache, and the second replacement queue includes data of which a life cycle attribute is the second life cycle in the local cache.

The preset replacement algorithm may be a least recently used (LRU) algorithm, a least frequently used (LFU) algorithm, a first input first output (FIFO) algorithm, or the like. In this step, the preset replacement algorithm is used to add data having the short life cycle in the local cache to the first replacement queue and add data having the long life cycle to the second replacement queue. It may be understood that the first replacement queue may include all or a part of data having the short life cycle in the local cache, and the second replacement queue may include all or a part of data having the long life cycle in the local cache. It may be understood that the data included in the first replacement queue and the data included in the second replacement queue are data which is deleted or replaced preferentially in the local cache.

B. If a size of the data to be cached is less than or equal to a total sum of sizes of all data in the first replacement queue, delete the existing data in the first replacement queue according to the size of the data. For example, if the size of the data to be cached is 300K and a size of first data in the first replacement queue is 300K, in this step, the first data in the first replacement queue is deleted. For another example, if the size of the data to be cached is 300K, a size of first data in the first replacement queue is 200K, and a size of second data in the first replacement queue is 200K, in this step, the first data and the second data in the first replacement queue are deleted. It should be noted that the data is replaced in the first replacement queue according to a first input first output rule. The first data in the first replacement queue is data entering the first replacement queue first, and the first data should also be data replaced first. The second data in the first replacement queue is data entering the first replacement data right after the first data enters the first replacement queue, and the second data should be data replaced right after the first data is replaced.

C. If the size of the data to be cached is greater than the total sum of sizes of all the data in the first replacement queue, delete all the data in the first replacement queue, and delete existing data in the second replacement queue according to a difference between the size of the data and the total sum of sizes of all data in the first replacement queue. For example, the size of the data to be cached is 1000K, the first replacement queue is 700K, a size of first data in the second replacement queue is 100K, and a size of second data in the second replacement queue is 300K, in this step, all data in the first replacement queue is first deleted, and then the first data and the second data in the second replacement queue are deleted. It should be noted that the data is replaced in the first replacement queue and the second replacement queue according to the first input first output rule. The first data in the second replacement queue is data entering the second replacement queue first, and the first data should also be data replaced first. The second data in the second replacement queue is data entering the second replacement data right after the first data enters the second replacement queue, and the second data should be data replaced right after the first data is replaced.

The foregoing step B and step C show that in a process of updating by the local cache, the local cache first deletes or replaces the data in the first replacement queue, that is, data having the short life cycle, and then deletes or replaces the data in the second replacement queue, that is, data having the long life cycle. After the foregoing step A to step C are performed, the process proceeds to step s1303.

It may be understood that when the size of the data to be cached is greater than the total sum of sizes of all the data in the first replacement queue and the second replacement queue, in this embodiment of the present invention, if the total sum of sizes of all the data in the first replacement queue and/or the second replacement queue is less than a size of total storage space in the local cache, that is, the first replacement queue and the second replacement queue include only some existing data in the local cache, all the data in the first replacement queue and the second replacement queue is deleted, and a new first replacement queue and a new second replacement queue are re-generated by using a preset replacement algorithm to release enough storage space. Then, step s1303 is performed. If the total sum of sizes of all the data in the first replacement queue and/or the second replacement queue is equal to the size of the total storage space of the local cache, that is, the first replacement queue and the second replacement queue include all existing data in the local cache, step s1303 may not be performed any more in this embodiment of the present invention, and error information may be output to prompt that the size of the data already exceeds the total storage space of the local cache and the data cannot be cached.

s1303. Store, in the local cache, the data having the life cycle attribute.

FIG. 3 is a flowchart of another data processing method according to an embodiment of the present invention. The method may include the following step S201 to step S212.

S201. Receive a request message sent by a requester, where the request message carries an identifier of data that is requested to be obtained.

The requester may be a user terminal, and the request message may be sent in the form of an interest packet, where the interest packet uses a "name" as a unique identifier and the interest packet includes an identifier of the data that is requested to be obtained, where the identifier may be the "name" of the data.

S202. Search for the data in a local cache according to the identifier.

In this step, the identifier may be compared with an identifier of data in the local cache. If the local cache has data corresponding to an identifier that is the same as the identifier, the data can be found in the local cache, otherwise, the data cannot be found in the local cache.

S203. Determine whether the data is found in the local cache. If a determining result is yes, the process proceeds to step S211, and if a determining result is no, the process proceeds to step S204.

S204. Forward the request message to a next node according to routing information.

In this step, before the request message is forwarded to the next node, the request message and information of an interface receiving the request message may be first recorded. Preferably, the request message and the information of the interface receiving the request message may be recorded in the form of a list, where the list may be a pending interest table (PIT). In an NDN system, a request path of data is the same as a response path of the data. Therefore, by recording the information of the interface receiving the request message, the requested data is easily returned to the requester by using the recorded interface information.

The routing information may be pre-stored in a forward information base (FIB). In this step, the routing information may be obtained by searching the FIB, and the request message is forwarded to the next node according to information of the next node recorded in the routing information. The next node may be another router except a local end router and may also be a data source. It may be understood that when the local end router forwards the request message to the next node, the local end router is a data requester of the next node.

S205. Receive data which is returned by the next node according to the request message.

S206. When the data is received, obtain a priority attribute of the data.

S207. Set a life cycle attribute for the data according to a correspondence between the priority attribute and the life cycle attribute.

S208. Store, in the local cache, the data having the life cycle attribute. The local cache performs storage updating according to the life cycle attribute of the data stored in the local cache, where the updating operation may include deleting existing data or replacing existing data.

In this embodiment, for step S206 to step S208, reference may be made to step S101 to step S103 in the embodiment shown in FIG. 1, which is not further described herein.

S209. Re-set the priority attribute for the data according to a priority setting rule.

In a feasible implementation manner of the present invention, the priority setting rule may be shown in the following Table 3.

TABLE 3

Priority setting rule table (1)

| Priority attribute when data is received | Priority attribute when data is forwarded |
| --- | --- |
| Low priority | Intermediate priority |
| Intermediate priority | High priority |
| Intermediate priority | Low priority |
| High priority | Low priority |

The foregoing Table 3 shows a rule for setting, between priorities, a priority attribute for data when the data is forwarded. According to the foregoing Table 3, in this implementation manner, the priority setting rule may include that if data of which a priority attribute is the low priority is received, the priority attribute of the data is re-set to the intermediate priority when the data is forwarded, and if data of which a priority attribute is the intermediate priority is received, the priority attribute of the data is re-set to the low priority or the high priority according to a random probability when the data is forwarded. For the random probability, reference may be made to the related descriptions in the embodiment shown in FIG. 1, which is not further described herein, and if data of which a priority attribute is the high priority is received, the priority attribute of the data is re-set to the low priority when the data is forwarded.

Further, according to a storage position of the data, the priority setting rule may be shown in the following Table 4.

TABLE 4

Priority setting rule table (2)

| Position where data exists in a request process | Priority attribute |
| --- | --- |
| Local cache | Low priority |
| Data source | Intermediate priority |

According to the foregoing Table 4, in this implementation manner, the priority setting rule may further include that if the data exists in the local cache, the priority attribute of the data is set to the low priority, and if the data exists in the data source, the priority attribute of the data is set to the intermediate priority.

In another feasible implementation manner of the present invention, if each priority includes more than one level, for example, the low priority may include a level 1-1, a level 1-2, and a level 1-3; the intermediate priority may include a level 2-1 and a level 2-2; the high priority may include a level 3-1 and a level 3-2, the priority setting rule may be shown in the following Table 5.

TABLE 5

Priority setting rule table (3)

| Priority attribute when data is received | Priority attribute when data is forwarded |
| --- | --- |
| Low priority-level 1-1 | Low priority-level 1-2 |
| Low priority-level 1-2 | Low priority-level 1-3 |
| Low priority-level 1-3 | Intermediate priority-level 2-1 |
| Intermediate priority-level 2-1 | Intermediate priority-level 2-2 |
| Intermediate priority-level 2-2 | Low priority-level 1-1 |
| Intermediate priority-level 2-2 | High priority-level 3-1 |
| High priority-level 3-1 | High priority-level 3-2 |
| High priority-level 3-2 | Low priority-level 1-1 |

It may be understood that the foregoing Table 5 shows that, between priorities, when data is forwarded, the priority attribute setting rule uses the rule shown in Table 3, and the foregoing Table 5 also shows that, between levels included in priorities, when data is forwarded, the priority attribute is set by using an ascending principle. The foregoing Table 5 is only an example. When levels included in each priority change, each item in the foregoing Table 5 changes accordingly.

S210. Return the data having the re-set priority attribute to the requester. Then, the process ends.

It should be noted that in this embodiment of the present invention, step S207 to step S208 may be first performed, and then step S209 to step S210 are performed, that is, the data is first stored in the local cache, and then the priority attribute of the data is re-set and the data is forwarded to the requester, or step S209 to step S210 may be first performed, and then step S207 to step S208 are performed, that is, the priority attribute of the data is re-set and the data is forwarded to the requester, and then the data is stored in the local cache, or step S207 to step S208 and step S209 to step 210 may be performed simultaneously, that is, the received data is cached and forwarded at the same time.

S211. If the data is found in the local cache, set, according to the priority setting rule, a priority attribute for the found data that is requested to be obtained.

According to the priority setting rule in the foregoing implementation manner, in this step, if the data is found in the local cache, the priority attribute of the data is set to the low priority.

S212. Return the data having the priority attribute to the requester.

It can be known from the above description that in some feasible implementation manners of the present invention, data includes a priority attribute, a life cycle attribute of the data is set according to the priority attribute of the data, and the data having the life cycle attribute is stored in a local cache, because when routers receive the same data, there may be a difference between the priority attributes of the data received by the routers, there may also be a difference between the life cycle attributes of the data which are obtained according to the priority attributes. In this way, a differentiated caching policy can be formed between the routers, so that the same data has different life cycles in caches of the routers, which can ensure data diversity in an NDN system, and meanwhile increase a data hit ratio in the NDN system.

The following describes, with reference to FIG. 4 to FIG. 7, a router provided by embodiments of the present invention in detail. The following router may be applied to an NDN system and may be applied to the method in the embodiments shown in the foregoing FIG. 1 to FIG. 3.

Figure 4:
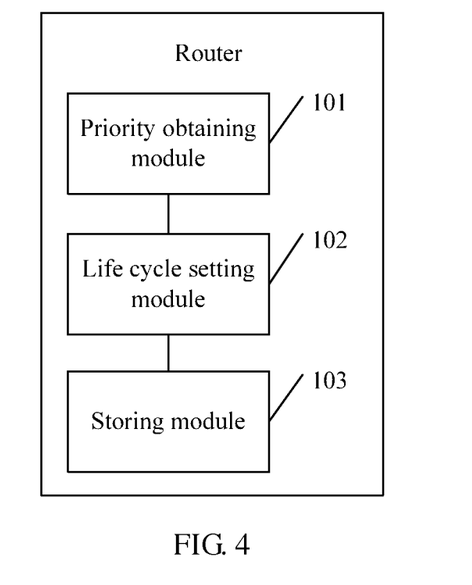
FIG. 4 is a schematic structural diagram of a router according to an embodiment of the present invention.

FIG. 4 is a schematic structural diagram of a router according to an embodiment of the present invention. The router may include a priority obtaining module 101, a life cycle setting module 102, and a storing module 103.

The priority obtaining module 101 is configured to obtain a priority attribute of the data when data is received.

The priority attribute may include a low priority and a high priority, or include a low priority, an intermediate priority, and a high priority.

The life cycle setting module 102 is configured to set a life cycle attribute for the data according to a correspondence between the priority attribute and the life cycle attribute.

The life cycle setting module 102 may set a life cycle attribute for the data according to the correspondence between the priority attribute and the life cycle attribute shown in the foregoing Table 1 or Table 2.

The storing module 103 is configured to store, in a local cache, the data having the life cycle attribute, where the local cache updates, according to the life cycle attribute, existing data stored in the local cache.

Figure 5:
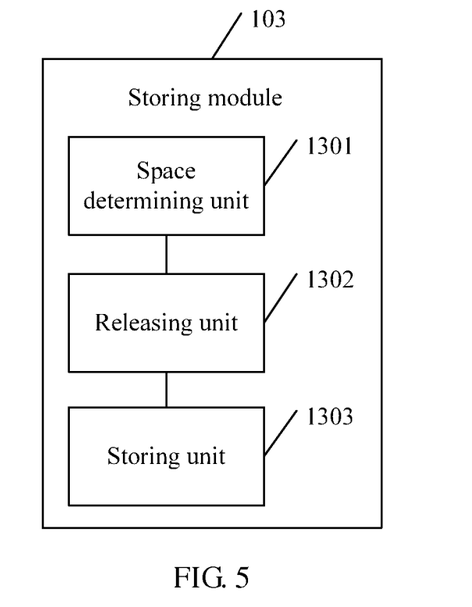
FIG. 5 is a schematic structural diagram of an embodiment of a storing module shown in FIG. 4.

FIG. 5 is a schematic structural diagram of an embodiment of the storing module shown in FIG. 4. The storing module 103 may include a space determining unit 1301, a releasing unit 1302, and a storing unit 1303.

The space determining unit 1301 is configured to determine, according to a size of the data, whether the local cache has enough storage space.

The releasing unit 1302 is configured to if a determining result is no, release storage space of the local cache according to the life cycle attribute of the existing data in the local cache.

The releasing unit 1302 updates the existing data in the local cache by using a preset replacement algorithm, to release the storage space of the local cache.

Figure 6:
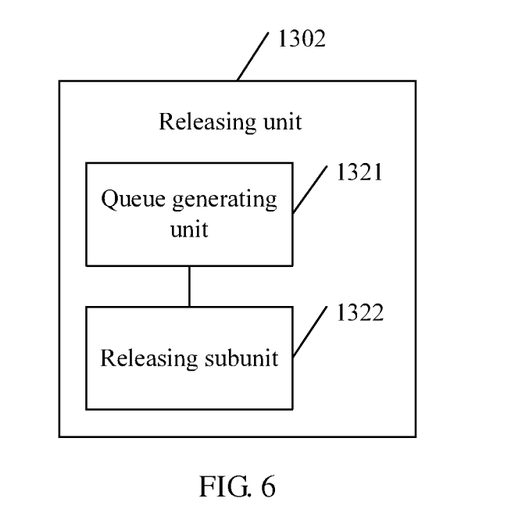
FIG. 6 is a schematic structural diagram of an embodiment of a releasing module shown in FIG. 5.

FIG. 6 is a schematic structural diagram of an embodiment of the releasing unit shown in FIG. 5. The releasing unit 1302 may include a queue generating unit 1321 and a releasing subunit 1322.

The queue generating unit 1321 is configured to if a determining result is no, generate a first replacement queue and a second replacement queue by using the preset replacement algorithm, where the first replacement queue includes data of which a life cycle attribute is a first life cycle in the local cache, and the second replacement queue includes data of which a life cycle attribute is a second life cycle in the local cache.

The releasing subunit 1322 is configured to if a size of the data to be cached is less than or equal to a total sum of sizes of all data in the first replacement queue, delete the existing data in the first replacement queue according to the size of the data, or if the size of the data to be cached is greater than the total sum of sizes of all the data in the first replacement queue, delete all the data in the first replacement queue, and delete existing data in the second replacement queue according to a difference between the size of the data and the total sum of sizes of all the data in the first replacement queue.

The storing unit 1303 is configured to store, in the local cache, the data having the life cycle attribute.

Figure 7:
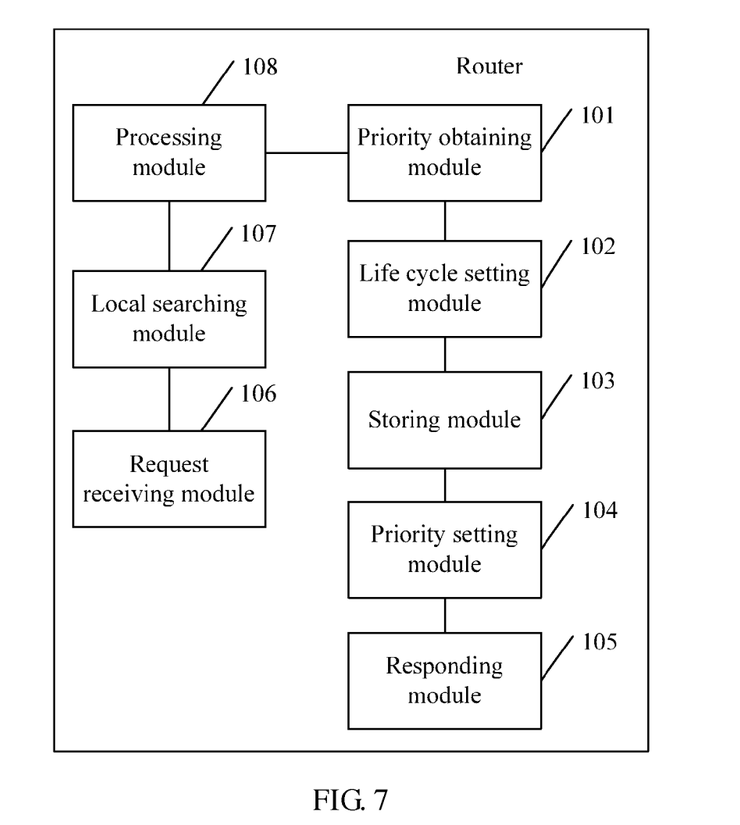
FIG. 7 is a schematic structural diagram of another router according to an embodiment of the present invention.

FIG. 7 is a schematic structural diagram of another router according to an embodiment of the present invention. The router may include a priority obtaining module 101, a life cycle setting module 102, a storing module 103, a priority setting module 104, a responding module 105, a request receiving module 106, a local searching module 107, and a processing module 108. For structures and function implementations of the priority obtaining module 101, the life cycle setting module 102, and the storing module 103, reference may be made to the related descriptions of the embodiment shown in FIG. 4, which are not further described herein.

The priority setting module 104 is configured to re-set a priority attribute for the data according to a priority setting rule.

The priority setting module 104 may re-set a priority attribute for the data according to the priority setting rule shown in the foregoing Table 3 or Table 5.

The responding module 105 is configured to return the data having the re-set priority attribute to a requester of the data.

The request receiving module 106 is configured to receive a request message sent by the requester, where the request message carries an identifier of data that is requested to be obtained.

The requester may be a user terminal, and the request message may be sent in the form of an interest packet, where the interest packet uses a "name" as a unique identifier and the interest packet includes an identifier of the data that is requested to be obtained, where the identifier may be the "name" of the data.

The local searching module 107 is configured to search for the data in a local cache according to the identifier.

The processing module 108 is configured to if the data is not found in the local cache, forward the request message to a next node according to routing information, and receive data which is returned by the next node according to the request message.

In an actual application, the processing module 108 may obtain the routing information by searching an FIB, and before forwarding the request message to the next node, the processing module may also record, in the form of a list, the request message and information of an interface receiving the request message, where the list may be a PIT. In an NDN system, a request path of data is the same as a response path of the data. Therefore, by recording the information of the interface receiving the request message, the requested data is easily returned to the requester by using the recorded interface information. The next node may be another router except a local end router and may also be a data source. It may be understood that when the local end router forwards the request message to the next node, the local end router is a data requester of the next node.

In a specific implementation, the processing module 108 is further configured to if the data is found in the local cache, instruct the priority setting module 104 to set, according to a priority setting rule, a priority attribute for the found data that is requested to be obtained, and return the data having the priority attribute to the requester. In this case, the priority setting module 104 may set a priority attribute for the found data according to the priority setting rule shown in the foregoing Table 4.

It may be understood that the functions of the router of the embodiments shown in FIG. 4 to FIG. 7 may be specifically implemented according to the method in the method embodiments shown in FIG. 1 to FIG. 3. For the specific implementation process, reference may be made to the related descriptions in the foregoing method embodiments, which is not further described herein.

It can be known from the above description that in some feasible implementation manners of the present invention, data includes a priority attribute, a life cycle attribute of the data is set according to the priority attribute of the data, and the data having the life cycle attribute is stored in a local cache, because when routers receive the same data, there may be a difference between the priority attributes of the data received by the routers, there may also be a difference between the life cycle attributes of the data which are obtained according to the priority attributes. In this way, a differentiated caching policy can be formed between the routers, so that the same data has different life cycles in caches of the routers, which can ensure data diversity in an NDN system, and meanwhile increase a data hit ratio in the NDN system.

Figure 8:
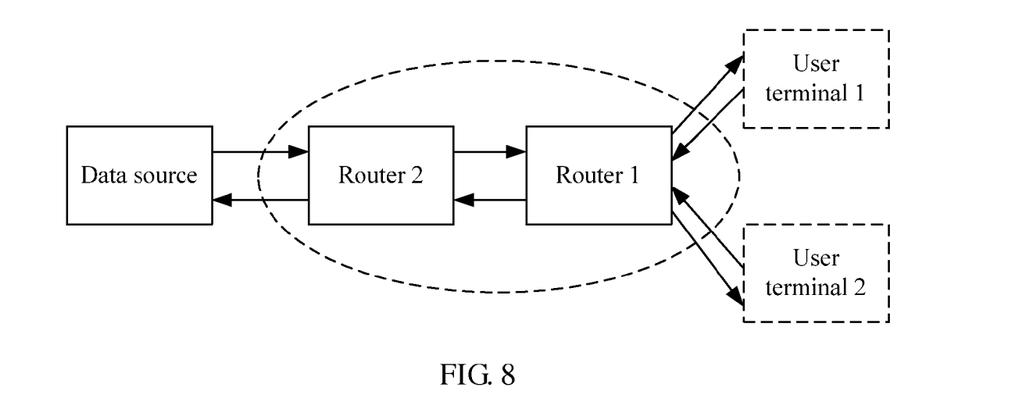
FIG. 8 is a schematic structural diagram of an NDN system according to an embodiment of the present invention.

The following describes, with reference to FIG. 8, an NDN system to which the router is applied. It should be noted that the following NDN system may be applied to the method of the embodiments shown in the foregoing FIG. 1 to FIG. 3.

FIG. 8 is a schematic structural diagram of an NDN system according to an embodiment of the present invention. The NDN system may include a data source and at least one router (FIG. 8 shows two routers, which are marked as a router 1 and a router 2), where the router may be the router shown in any one embodiment in FIG. 4 to FIG. 7.

The data source is connected to the at least one router and is configured to return, to the router according to a request message sent by the router, data that is requested to be obtained.

The data source receives a request message sent by the router, where the request message carries an identifier of the data that is requested to be obtained, and the data source obtains the data according to the identifier. In a feasible implementation manner of the present invention, the data source may return the data not having a priority attribute to the router. After receiving the data, the router sets a priority attribute for the data according to a priority setting rule. The data source may also set a priority attribute for the data according to the priority setting rule, and return the data having the priority attribute to the router.

It should be noted that in the foregoing implementation manner, the priority setting rule is determined mainly according to a storage position of the data, and the priority setting rule may include if data exists in the data source, setting the priority attribute of the data to an intermediate priority.

The following describes in detail a data processing process performed by the NDN system shown in FIG. 8.

A user terminal 1 sends a request message to a router 1 to initiate a data communication process, where the request message carries a "name" of data that is requested to be obtained.

The router 1 searches for the data in the local cache according to the "name" of the data in the request message. If the router 1 finds the data, the router 1 sets the priority attribute of the data to a low priority, and then returns the data of the low priority to the user terminal 1. If the router 1 does not find the data, the router 1 searches an FIB to obtain routing information. Assuming that the routing information indicates that a next node is the router 2, the router 1 records, in the router 1, the request message and information of an interface receiving the request message, and forwards the request message to the router 2.

The router 2 searches for the data in the local cache according to the "name" of the data in the request message. If the router 2 finds the data, the router 2 sets the priority attribute of the data to the low priority, and then returns the data of the low priority to the router 1. After the router 1 receives the data, if the router 1 parses that the priority attribute of the data is the low priority, the router 1 sets the life cycle attribute of the data to a short life cycle, and stores, in a local cache, the data having the short life cycle, and then the router 1 re-sets the priority attribute of the data to a high priority, and returns the data of the reset high priority to the user terminal 1 according to the information, of the interface receiving the request message, recorded in the router 1.

If the router 2 does not find the data in the local cache, the router 2 searches the FIB to obtain routing information. Assuming that the routing information indicates that the next node is a data source, the router 2 records, in the router 2, the request message and the information of the interface receiving the request message, and forwards the request message to the data source. The data source searches for the data in the local cache according to the "name" of the data in the request message, sets the priority attribute of the data to an intermediate priority, and returns the data of the intermediate priority to the router 2. After the router 2 receives the data, if the router 2 parses that the priority attribute of the data is the intermediate priority, the router 2 sets the life cycle attribute of the data to a long life cycle according to a random probability, and stores, in a local cache, the data having the long life cycle. Then the router 2 re-sets the priority attribute of the data to the high priority according to the random probability, and returns the data having the reset high priority to the router 1 according to the information, of the interface receiving the request message, recorded in the router 2. After the router 1 receives the data, if the router 1 parses that the priority attribute of the data is the high priority, the router 1 sets the life cycle attribute of the data to the long life cycle, and stores, in a local cache, the data having the long life cycle. Then the router 1 re-sets the priority attribute of the data to the low priority, and returns the data having the reset low priority to the user terminal 1 according to the information, of the interface receiving the request message, recorded in the router 1.

In the foregoing data transmission process, the router 1 and the router 2 updates, in a process of caching data, the data in the local cache by using a preset replacement algorithm according to the life cycle attribute of the data. For the updating process, reference may be made to the related descriptions in the foregoing method embodiment, which is not further described herein. In addition, the router 1, the router 2, and the data source may set the priority attribute of the data according to the priority setting rule shown in the foregoing Table 3 or Table 4. When the router 1 and the router 2 store the data in the local cache, the router 1 and the router 2 may set a life cycle attribute of the data according to the correspondence between the priority attribute and the life cycle attribute shown in the foregoing Table 1 or Table 2.

It can be known from the above description that in some feasible implementation manners of the present invention, data includes a priority attribute, a life cycle attribute of the data is set according to the priority attribute of the data, and the data having the life cycle attribute is stored in a local cache; because when routers receive the same data, there may be a difference between the priority attributes of the data received by the routers, there may also be a difference between the life cycle attributes of the data which are obtained according to the priority attributes. In this way, a differentiated caching policy can be formed between the routers, so that the same data has different life cycles in caches of the routers, which can ensure data diversity in an NDN system, and meanwhile increase a data hit ratio in the NDN system.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The storage medium may include: a disk, an optical disc, a read-only memory (ROM), or a random access memory (RAM).

The disclosed are merely exemplary embodiments of the present invention, but are not intended to limit the scope of the present invention. Equivalent variation figured out according to the claims shall fall within the protection scope of the present invention.

What is claimed is:

1. A method for processing data by a router, the method comprising:
   receiving first data;
   setting a first life cycle for the first data according to a first priority associated with the first data;
   storing the first data;
   receiving a first request for the first data;
   assigning a second priority to the first data; and
   sending the first data to a requester of the first data after assigning the second priority to the first data,
   wherein a second life cycle corresponds to the second priority, and
   wherein a level of the first priority is different from a level of the second priority.

2. The method of claim 1, further comprising:
   receiving second data associated with a third priority;
   setting the first life cycle or the second life cycle for the second data according to a random probability, wherein a level of the third priority is between the level of the first priority and the level of the second priority; and
   storing the second data.

3. The method of claim 2, further comprising returning the second data to a requester of the second data.

4. The method of claim 1, wherein the level of the second priority is higher than the level of the first priority, and wherein the second life cycle is longer than the first life cycle.

5. The method of claim 1, wherein the level of the first priority is higher than the level of the second priority, and wherein the first life cycle is longer than the second life cycle.

6. A router comprising:
   a memory configured to store instructions; and
   a processor coupled to the memory, wherein the instructions cause the processor to be configured to:
   receive first data;
   set a first life cycle for the first data according to a first priority associated with the first data;
   store the first data;
   receive a first request for the first data;
   assign a second priority to the first data; and
   send the first data to a requester of the first data after assigning the second priority to the first data,
   wherein a second life cycle corresponds to the second priority, and
   wherein a level of the first priority is different from a level of the second priority.

7. The router of claim 6, wherein the processor is further configured to:
   receive second data associated with a third priority;
   set the first life cycle or the second life cycle for the second data according to a random probability, wherein a level of the third priority is between the level of the first priority and the level of the second priority; and
   store the second data.

8. The router of claim 7, wherein the processor is further configured to return the second data to a requester of the second data.

9. The router of claim 6, wherein the level of the second priority is higher than the level of the first priority, and wherein the second life cycle is longer than the first life cycle.

10. The router of claim 6, wherein the level of the first priority is higher than the level of the second priority, and wherein the first life cycle is longer than the second life cycle.

11. The method of claim 1, further comprising:
    determining a size of the first data;
    determining a free space of a local cache;
    determining at least a portion of existing data to delete based, at least in part, on an assigned life cycle associated with the portion of the existing data, when the size of the first data is greater than the free space; and
    deleting the portion of existing data from the local cache.

12. The method of claim 1, further comprising:
    receiving a second request for second data;
    determining the second data is not in a local cache;
    forwarding the second request to a node;
    receiving the second data;
    resetting an assigned priority of the second data; and
    transmitting the second data.

13. The method of claim 12, further comprising writing an entry in a table, the entry comprising an identifier of an interface that received the second request and information from the second request.

14. The router of claim 6, wherein the processor is further configured to:
    determine a size of the first data;
    determine a free space of a local cache;
    determine at least a portion of existing data to delete based, at least in part, on an assigned life cycle associated with the portion of the existing data, when the size of the first data is greater than the free space; and
    delete the portion of existing data from the local cache.

15. The router of claim 6, wherein the processor is further configured to:
    receive a second request for second data;
    determine the second data is not in a local cache;

forward the second request to a node;
receive the second data;
reset an assigned priority of the second data; and
transmit the second data.

16. The router of claim 15, wherein the processor is further configured to write an entry in a table, the entry comprising an identifier of an interface that received the second request and information from the second request.

* * * * *